(12) United States Patent
Singh et al.

(10) Patent No.: US 9,839,181 B2
(45) Date of Patent: Dec. 12, 2017

(54) OPERATION AND CONTROL OF BOTTOM FLOOR ASSEMBLY

(71) Applicant: CNH Industrial America LLC, New Holland, PA (US)

(72) Inventors: Chandrashekhar Singh, Aurangabad (IN); Carl M. Brewer, Ephrata, PA (US); Mark K. Chow, Paoli, PA (US); John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 130 days.

(21) Appl. No.: 14/850,087

(22) Filed: Sep. 10, 2015

(65) Prior Publication Data
US 2017/0071133 A1    Mar. 16, 2017

(51) Int. Cl.
  *G06F 7/00* (2006.01)
  *A01F 15/08* (2006.01)
  *A01F 15/18* (2006.01)
  *A01F 15/07* (2006.01)

(52) U.S. Cl.
  CPC ............... *A01F 15/08* (2013.01); *A01F 15/07* (2013.01); *A01F 15/18* (2013.01)

(58) Field of Classification Search
  CPC .......... A01F 15/08; A01F 15/07; A01F 15/18
  See application file for complete search history.

(56) References Cited

U.S. PATENT DOCUMENTS

| 4,275,550 | A | 6/1981 | Swenson et al. |
| 4,713,898 | A * | 12/1987 | Bull .................. E02F 3/181 37/104 |
| 4,862,684 | A | 9/1989 | Naaktgeboren et al. |
| 5,819,517 | A | 10/1998 | Amanatidis et al. |
| 6,112,507 | A | 9/2000 | Mesmer |
| 6,295,797 | B1 | 10/2001 | Naaktgeboren et al. |
| 6,644,006 | B1 | 11/2003 | Merritt et al. |
| 6,877,304 | B1 | 4/2005 | Smith et al. |
| 7,584,594 | B2 | 9/2009 | Viaud |
| 7,640,721 | B2 | 1/2010 | Viaud et al. |
| 8,206,205 | B2 | 6/2012 | Derscheid |
| 9,095,094 | B2 | 8/2015 | Ziembicki |

(Continued)

FOREIGN PATENT DOCUMENTS

| FR | 2692431 A1 | 12/1993 |
| FR | 2783130 | 3/2000 |
| WO | 2012146580 | 11/2012 |

OTHER PUBLICATIONS

U.S. Appl. No. 14/469,824, filed Aug. 27, 2014. U.S. Patent Application (Pending).

*Primary Examiner* — Ian Jen
(74) *Attorney, Agent, or Firm* — Patrick M. Sheldrake

(57) ABSTRACT

The disclosure relates to a harvester control system that allows for the operation and control of a bottom floor assembly by an operator of a harvester, such as a round baler. The harvester control system generally comprises at least one rotation sensor configured to measure the rotation angle of the bottom floor assembly during the harvesting process, a controller that receives information from the rotation sensor(s), and an operator interface configured to display warning information to the operator if the bottom floor assembly meets certain rotation and time parameters.

22 Claims, 6 Drawing Sheets

(56) References Cited

U.S. PATENT DOCUMENTS

| | | | |
|---|---|---|---|
| 2011/0117814 A1* | 5/2011 | Norman | A63H 11/02 |
| | | | 446/444 |
| 2011/0191001 A1 | 8/2011 | Viaud | |
| 2013/0167498 A1 | 7/2013 | Haycocks | |
| 2014/0096692 A1 | 4/2014 | Baldauf | |
| 2014/0165528 A1 | 6/2014 | Olander et al. | |
| 2014/0345239 A1* | 11/2014 | Cook | A01D 34/145 |
| | | | 56/10.1 |
| 2016/0057937 A1* | 3/2016 | McClure | A01F 15/08 |
| | | | 56/341 |
| 2016/0360705 A1* | 12/2016 | Singh | A01F 15/07 |

* cited by examiner

OPERATION AND CONTROL OF BOTTOM FLOOR ASSEMBLY

TECHNOLOGY FIELD

The present invention relates generally to a crop feeding system in a harvester, particularly to connections that allow for the operation and control of a bottom floor assembly by an operator.

BACKGROUND

For many years agricultural balers have been used to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, the cut crop material is gathered at the front of the baler from along the ground, onto a pickup assembly, and into a crop feeding channel where the material can be further cut before being introduced into a bale-forming chamber. Traditionally, the crop feeding channel is more narrow than the surrounding areas of the harvester, and clogging or plugging of the crop feeding channel is a common problem, especially if the harvester is being operated at higher speeds and thus passing greater amounts of crop material through the crop feeding channel at a given time. Once a clog occurs, the harvester must be stopped for the crop feeding channel to be cleared, reducing harvesting efficiency.

One method to prevent clogging is to design a harevster with a limited amount of movement of the bottom floor of the crop feeding channel. The bottom floor physically supports the crop material as it passes through the crop feeding channel and is cut by a rotor and knives before being moved to the bale forming chamber. By allowing the bottom floor to move, it can temporarily increase the volume of crop material that can be passed through the crop feeding channel, possibly preventing the formation of a clog. Once such example is described in U.S. patent application Ser. No. 14/469,824, incorporated herein by reference in its entirety, which provides a crop collection system with a limited movement of a bottom floor.

The instant application provides a system that allows an operator to control and operate the bottom floor assembly by an operator interface. The system also provides warning information to the operator if the drop floor system is active, allowing the operator to slow down harvesting or to take other measures that would prevent the formation of a clog.

SUMMARY

The disclosure relates to a harvester control system comprising: a bottom floor assembly comprising: at least a first hydraulic cylinder; a bottom floor frame comprising at least one face comprising a concave curvature and extending laterally across the bottom floor assembly; and one or a plurality of bottom floor plates, covering the at least one face, and defining the concave curvature of a crop collection channel; at least a first rotation sensor, located in or proximate to the bottom floor assembly, configured to measure the rotation angle of the bottom floor frame; a controller, in operable communication and configured to process information from the at least first rotation sensor; and an operator interface, in electronic communication with the controller, configured to display warning information about the rotation angle of the bottom floor frame to an operator. In some embodiments, the bottom floor frame is capable of a variable range of motion around at least a first pivot point. In some embodiments, the operator interface is further configured to receive and/or store a first rotational limit and a first time limit.

In some embodiments, the operator interface displays warning information about the rotation angle of the bottom floor frame, when the bottom floor frame is rotated to an angle greater than or equal to the first rotational limit, and said rotation is maintained for a duration of time greater than or equal to the first time limit.

In some embodiments, the harvester control system further comprises a first and a second cutting knife unit supported by the bottom floor frame; wherein both the first and the second cutting knife units comprise at least one or a plurality of blades; wherein, when the first and/or the second cutting knife units are in a loaded position, the at least one or a plurality of blades of the first and/or the second cutting knife units pass through at least one or a plurality of slots in the bottom floor plate; and wherein the at least one or a plurality of blades of the first cutting knife unit do not interfere with the at least one or a plurality of blades of the second cutting knife unit. In some embodiments, the at least one or a plurality of blades of the first and/or second cutting knife units partially protrude into the crop collection channel.

In some embodiments, the harvester control system further comprises at least a first knife unit placement sensor, located in or proximate to the bottom floor assembly and in operable communication with the controller, capable of detecting if the first and/or second cutting knife units are in their loaded positions. In some embodiments, the operator interface displays knife information about position of the first and/or second cutting knife units. In some embodiments, the at least first operator interface is further configured to receive and/or store a second and a third rotational limit and a second and a third time limit.

In some embodiments, the operator interface displays warning information about the rotation angle of the bottom floor frame when the first knife unit or the second knife unit is in a loaded position, the bottom floor frame is rotated to an angle greater than or equal to the second rotational limit, and said rotation is maintained for a duration of time greater than or equal to the second time limit. In some embodiments, the operator interface displays information about the rotation angle of the bottom floor frame when the first knife unit and the second knife unit is in a loaded position, the bottom floor frame is rotated to an angle greater than or equal to the third rotational limit, and said rotation is maintained for a duration of time greater than or equal to the third time limit. In some embodiments, the warning information displayed by the operator interface comprises visual and/or audible communication.

In some embodiments, the first rotation sensor comprises: at least a first bracket mechanically linked to a sidewall; an angle position sensor fastened to the at least first bracket; and a potentiometer, operably connected to an angle position sensor and rotatable around a first linear axis transverse to the sidewall; and wherein the angle position sensor is capable of detecting the rotation of the potentiometer. In some embodiments, the first rotation sensor further comprises: a first linking member, operably connected to the potentiometer; and a second linking member, operably connected to the first linking member at a second pivot point, and operably connected to the bottom floor frame at a third pivot point; and wherein movement of the bottom floor frame around the first pivot point causes movement of the first linking member and the potentiometer around the first linear axis.

The disclosure also relates to a computer-implemented method of controlling the operation of a harvester, in a system comprising a bottom floor assembly, at least a first rotation sensor, a controller, and an operator interface, said method comprising: (a) in the controller, receiving information corresponding to the rotational position of the bottom floor assembly from the at least first rotation sensor; (b) in the controller, sending an alert signal to the operator interface if the rotational position of the bottom floor assembly is greater than or equal to a first rotational limit for a continuous duration determined by at least a first time limit; and (c) in the operator interface, displaying visual and/or audible warning information if the alert signal is received from the controller. In some embodiments, the first rotational limit and the first time limit are imputed by an operator at the operator interface.

In some embodiments, the system further comprises a first cutting knife unit, a second cutting knife unit, and at least a first knife unit placement sensor, capable of detecting if the first and/or second cutting knife units are in a loaded position. In some embodiments, the method comprises: (a) in the controller, receiving information corresponding to the rotational position of the bottom floor assembly from the at least first rotation sensors; (b) in the controller, receiving information on the number of knife units in a loaded position from the at least first knife unit placement sensor; (c) in the controller, sending an alert signal to the operator interface if: (i) there are no knife units in a loaded position, the rotational position of the bottom floor assembly is greater than or equal to a first rotational limit for a continuous duration determined by a first time limit; (ii) there is one knife unit in a loaded position, the rotational position of the bottom floor assembly is greater than or equal to a second rotational limit for a continuous duration determined by a second time limit; or (iii) there are two knife units in a loaded position, the rotational position of the bottom floor assembly is greater than or equal to a third rotational limit for a continuous duration determined by a third time limit; and (d) in the operator interface, displaying visual and/or audible warning information if the alert signal is received from the controller. In some embodiments, the second rotational limit, the third rotational limit, the second time limit, and/or the third time are imputed by an operator at the operator interface.

DETAILED DESCRIPTION OF THE DISCLOSURE

Figure 1:
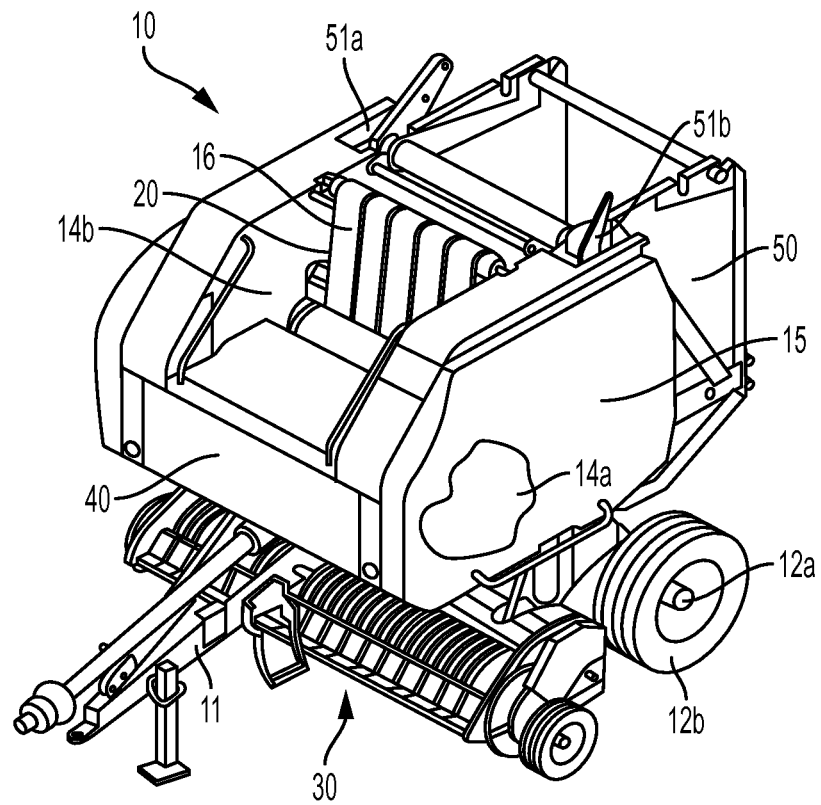
FIG. 1 depicts a static image of a baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. In some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, v which is incorporated herein by reference in its entirety, that illustrates such mechanisms.

As used herein, the term "roll" or "roller" are used interchangeably to mean a substantially cylindrical member that rotates about an axis. In some embodiments, the rolls are components of the serpentine system and run longitudinally across the length and/or transversely across the width of the agricultural harvester or system and support one or a plurality of baling belts that convey harvested crop material in a harvester or system in a harvester while the harvester or system is in operation.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the sides of the bale chamber are defined by oppositely facing side walls and the bottom of the bale chamber is defined by at least one floor roll that spans transverse to the sidewalls, that partially supports the weight of the bale in the bale chamber, and is in operable contact with one or a plurality of baling belts. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "cutting implement" as used herein is defined as a device involved with the cutting of crop material, including one or a plurality of knives, blades, teeth, gears, grinders, sissors, or rotors. In some embodiments, the harvester assembly is equipped with a "rotor cutter" comprising a rotor, a plurality of knife blades attached to one or more knife units, components to support the knife units and allow for the insertion and removal of the knife units within the bottom floor assembly, and a slotted bottom floor through which the knife blades protrude. In some embodiments, the harvester assembly is equipped with a "rotor feeder" comprising a rotor and a solid bottom floor. The term "knife unit" as it relates to a cutting implement refers to a removable tray designed to support a plurality of knife blades. In some embodiments, a knife unit may be in an "unloaded" or "retracted" position, whereby the knife blades operably connected to the knife unit do not protude through the slotted bottom floor. In some embodiments, a knife unit may be in a "loaded" or "forward" position, whereby the knife blades operably connected to the knife unit completely or partically protude through the slotted bottom floor and into the pathway crop material takes as it is being harvested.

The term "rotation angle" as used herein is defined as the degree of rotation of a bottom floor assembly of a harvester around a pivot point. In some embodiments, the zero point or starting point used to measure the rotation angle is the starting position of the bottom floor assembly, for example, when there is no pressure on the bottom floor assembly, or not enough pressure on the bottom floor assembly to cause any rotational movement around the pivot point. In some embodiments, movement of the bottom floor assembly is measured as the degree of rotation of the bottom floor assembly around a pivot point. In some embodiments, the rotational angle of the bottom floor assembly is measured by a rotation sensor. In some embodiments, larger movement in the bottom floor assembly correspond to a larger rotational angle measured by the rotation sensor.

The term "information" as used herein is defined as data values attributed to parameters. In some embodiments, information is digital and/or analog information. In some embodiments, information is the current rotation angle of a bottom floor assembly. In some embodiments, information is the current rotation angle of a rotation sensor. In some embodiments, information is warning information, such as warning information sent to a display or a type of operator interface. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system comprising a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, I/O devices may be couple to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The term "real-time" and the phrase "in real-time" as used herein are defined as a way of describing a process, event, or action that occurs simultaneously with the process of actively forming a bale in a bale chamber. In some embodiments, various sensors, for example a rotation sensor, continuously sense information about the rotation angle of a bottom floor assembly and transmit that information to a controller in real-time. In some embodiments, an operator may adjust values in an operator interface in real-time by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such harvesters, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism.

The present disclosure relates to a bottom floor assembly control and information system that is capable of providing information to an operator regarding the opening or displacement of a bottom floor assembly during crop collection. Specifically, the system is capable of measuring the angle of rotation of the bottom floor assembly and warning the operator, via an operator interface, if said rotation exceeds certain degree and time limitations. In some embodiments, the system is also capable of detecting the position of one or more cutting knife units, and if one or more cutting knife units are in a loaded position, such that their individual knife blades are active in the crop collection channel, the system can adjust the degree and time limitations before warning the operator. In some embodiments, the operator is capable of inputting desired parameters, for example, the rotation limit of the bottom floor assembly and the amount of time that rotation limit must be sustained (time limit) for the system to warn the operator. In some embodiments, the operator is capable of multiple rotation limits and time limits, so that the system has different warning parameters depending on how many cutting knife units are in a loaded position. In some embodiments, the bottom floor assembly is capable of moving to a maximally open position to assist in the manual removal of a plug or other blockage that was incapable of being cleared by other means. In some embodiments, the harvester automatically shuts off when the bottom floor assembly moves to the maximally open position. In some embodiments, information system is capable of providing information to an operator regarding the maximally open position of the bottom floor assembly.

In some embodiments, the present disclosure relates to a rotational sensor, capable of measuring the angle of rotation of a bottom floor assembly around a pivot point and sending this rotational angle measurement to a controller. In some embodiments, the rotation sensor and a potentiometer are positioned about an axis, and are attached to a harvester sidewall by a bracket. The potentiometer is operably connected to a hydraulic cylinder of the bottom floor assembly by a series of mechanical members or rods. Movement of the hydraulic cylinder is translated into rotational movement of the potentiometer around the axis by the series of mechanical members. In some embodiments, movement of the potentiometer is detected by the rotation sensor and this rotational information is sent to a controller. In some embodiments, the position of the potentiometer when the bottom floor is in its normal operating position is the default or zero position for the rotation sensor. In some embodiments, the position of the potentiometer when the hydraulic cylinders are maximally retracted is the default or zero position for the rotation sensor. In some embodiments, the rotation of the potentiometer around the axis is equal to or approximately equal to the rotation of the bottom floor assembly around its pivot point. In some embodiments, the rotation sensor and a string potentiometer are positioned at or approximately at the point where the hydraulic cylinder is attached to the bottom floor assembly. The string of the string potentiometer is positioned at or approximately at the point where the hydraulic cylinder is attached to the frame or subframe of a harvester. In some embodiments, movement of the hydraulic cylinder is translated into a change of length of the string potentiometer. In some embodiments, the change of length of the string potentiometer is detected by the rotation sensor and this information is sent to a controller. In some embodiments, the controller receives change of length information from the rotation sensor, and determines the change of rotation of the bottom floor assembly. In some embodiments, the position of the string potentiometer when the hydraulic cylinder are maximally retracted is the default or zero position for the rotation sensor.

In some embodiments, the present disclosure relates to a method of operating a harvester comprising a bottom floor assembly, at least a first rotation sensor, a controller, and an operator interface. In some embodiments, the method comprises: in the controller, receiving information on the rotational position of the bottom floor assembly from the at least first rotation sensor; in the controller, sending an alert signal to the operator interface if the rotational position of the bottom floor assembly is greater than or equal to a first rotational limit for a continuous duration determined by a first time limit; and in the operator interface, displaying visual and/or audible warning information if the alert signal is received from the controller. In some embodiments, the operator can input the desired rotational and time limits by using the operator interface. In some embodiments, the bottom floor assembly In some embodiments, the present disclosure relates to a method of operating a harvester comprising a bottom floor assembly, at least a first rotation sensor, a controller, an operator interface, a first cutting knife unit, a second cutting knife unit, and at least a first knife unit placement sensor capable of detecting if the first and/or second cutting knife units are in a loaded position. In some embodiments, the method comprises: (a) in the controller, receiving information on the rotational position of the bottom floor assembly from the at least first rotation sensors; (b) in the controller, receiving information on the number of knife units in a loaded position from the at least first knife unit placement sensor; (c) in the controller, sending an alert signal to the operator interface if: (i) there are no knife units in a loaded position, the rotational position of the bottom floor assembly is greater than or equal to a first rotational limit for a continuous duration determined by a first time limit; or (ii) there is one knife unit in a loaded position, the rotational position of the bottom floor assembly is greater than or equal to a second rotational limit for a continuous duration determined by a second time limit; or (iii) there are two knife units in a loaded position, the rotational position of the bottom floor assembly is greater than or equal to a third rotational limit for a continuous duration determined by a third time limit; and (d) in the operator interface, displaying visual and/or audible warning information if the alert signal is received from the controller.

Referring to the figures, FIG. 1 is a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed through a harvesting assembly (not shown) into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground.

Figure 2:
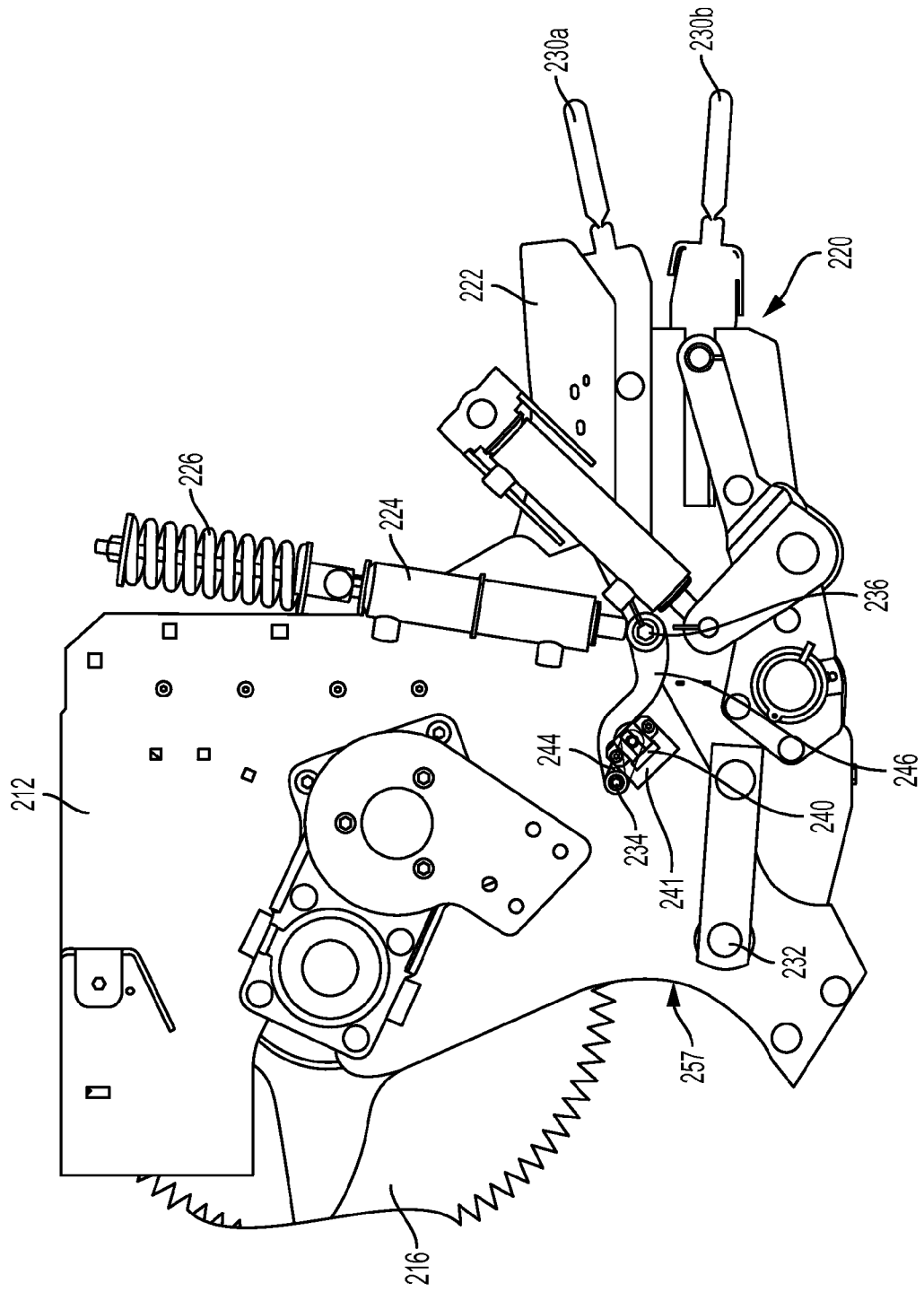
FIG. 2 depicts a harvester assembly with a bottom floor.

FIG. 2 depicts an exemplary embodiment of a harvesting assembly comprising a bottom floor assembly generally designated 220. The harvesting assembly further comprises a pair of sidewalls (only one of which 212, is shown), between which a rotor and a series of blades 216 rotate along an axis. The pair of sidewalls 212 connects the harvesting assembly to the main frame of a harvester. The volume of space between the bottom floor assembly 220 and the rotor and series of blades is known as a crop collection channel. The bottom floor assembly 220 comprises a bottom floor frame 222, upon which is attached a pair of hydraulic cylinders 224 (only one shown), a pair of compressible members 226 (only one shown), and two cutting knife units 230a and 230b. The bottom floor assembly 220 is configured for radial movement around a first pivot point 232 located towards the front of the bottom floor assembly. The first pivot point 232 mechanically links the bottom floor assembly 220 with the sidewalls 212 by a member such as a rod, pin, or rotatable bolt. In this embodiment, crop material enters the harvesting assembly from the left hand side of the illustration through an inlet 257. As crop material enters the crop collection channel, it exerts pressure on the bottom floor assembly 220. If too much crop material enters at a given time, the pressure on the bottom floor assembly 220 may exceed the tension of the compressible members 226, such that the rearward end of the bottom floor assembly 220 pivots radially around the first pivot point 232 away from the rotor and blades 216. The radial movement of the bottom floor assembly 220 increases the volume of the crop collection channel, allowing the larger amount of crop material to pass through without plugging or clogging the harvester. When the larger amount of crop material has passed through the crop collection channel, tension from the compressible member 226 returns the bottom floor assembly 220 to its original position. None, one, or both of the cutting knife units 230a and 230b can be in a loaded position, meaning that the individual knife blades (not shown) associated with each cutting knife unit are in an active crop cutting position within the crop collection channel.

Figure 3:
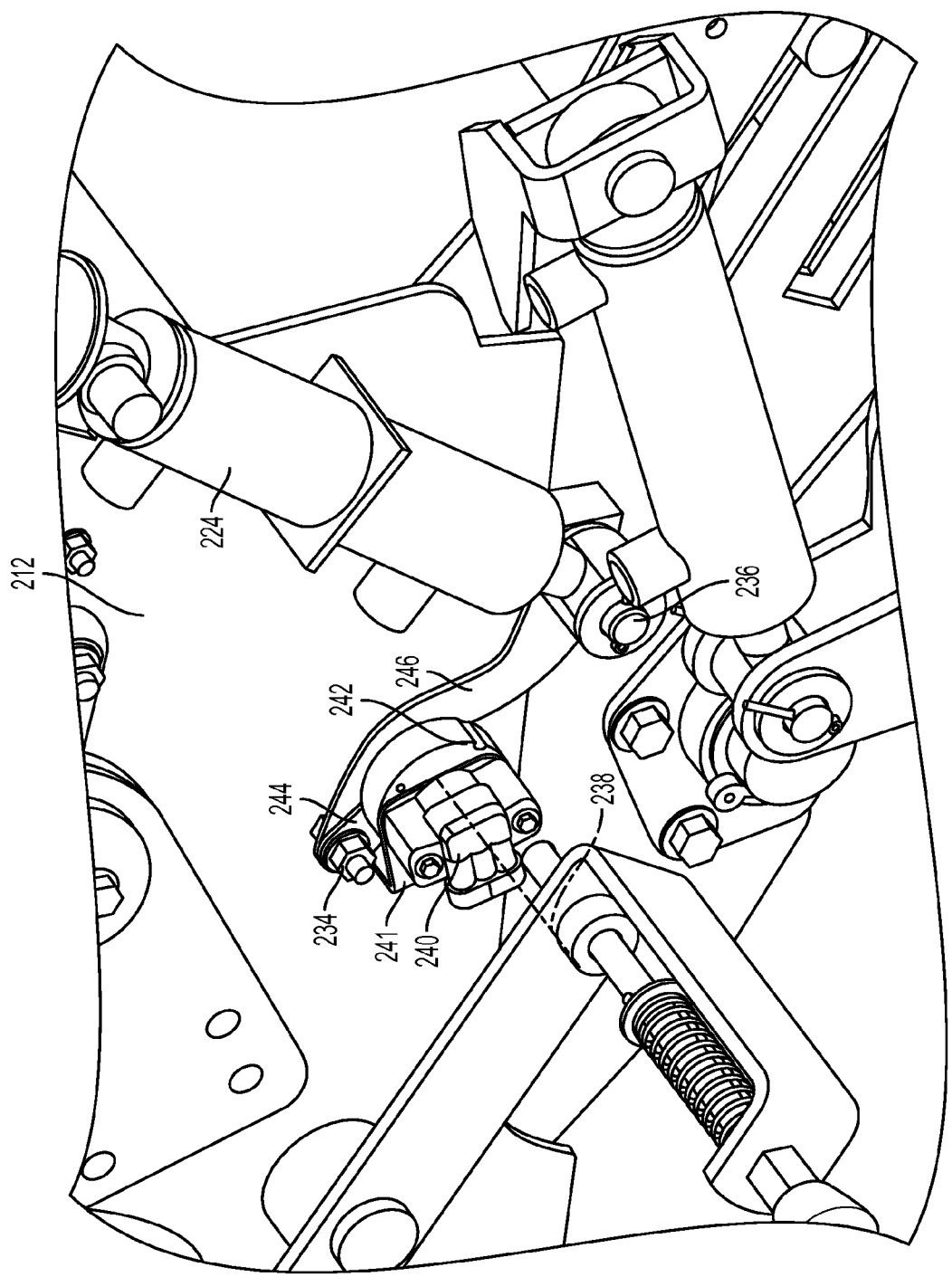
FIG. 3 depicts a rotation sensor attached to one embodiment of a harvester assembly.

The rotation of the bottom floor assembly 220 is measured by a rotation sensor 240. In FIG. 2, the rotation sensor 240 is shown attached to the sidewall 212 by a bracket 241. The rotation sensor 240 is also attached to the bottom floor assembly 220 and hydraulic cylinder 224 by a first linking member 244 and a second linking member 246. FIG. 3 depicts a more detailed view of the rotation sensor 240. The bracket 241 attaches both the rotation sensor 240 and a potentiometer 242 to the sidewall 212. The potentiometer 242 is capable of rotation around a linear axis 238, and is operably connected to the first linking member 244. The first linking member 244 is operably connected to the second linking member 246 by a second pivot point 234. The second linking member 246 is connected to both the bottom floor assembly 220 and the hydraulic cylinder 224 at a third pivot point 236. At the starting position of the bottom floor assembly 220 (e.g. when there is no pressure on the bottom floor assembly 220 and no movement around the first pivot point 232), the signal reading from the rotation sensors 240 is zero. Movement of the bottom floor assembly 220 moves the second linking member 246, which, in turn, moves the first linking member 244 and the potentiometer 242 around the linear axis 238. Larger movements in the bottom floor assembly 220 correspond to larger rotational movements in the potentiometer 242 and a larger signal reading from the rotation sensor 240. Information from the rotation sensor 240 is sent to a controller in real-time during the operation of the harvester and harvesting assembly.

Figure 4:
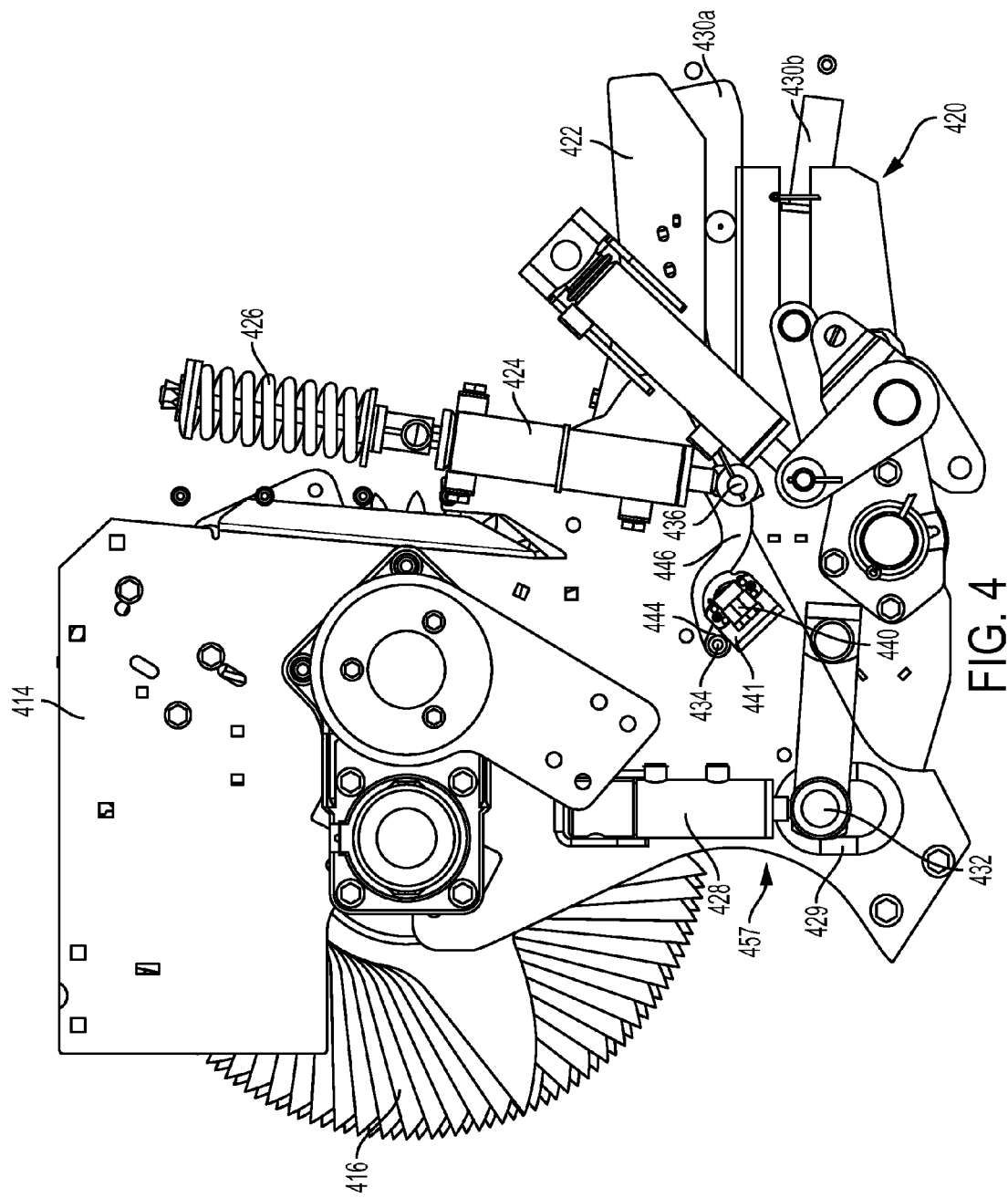
FIG. 4 depicts a rotation sensor attached to a different embodiment of a harvester assembly.

FIG. 4 depicts an exemplary embodiment of a harvesting assembly comprising a bottom floor assembly generally designated 420. The harvesting assembly further comprises a pair of sidewalls (only one of which 414, is shown), between which a rotor and a series of blades 416 rotate along an axis. The pair of sidewalls 414 connects the harvesting assembly to the main frame of a harvester. The volume of space between the bottom floor assembly 420 and the rotor and series of blades is known as a crop collection channel. The bottom floor assembly 420 comprises a bottom floor frame 422, upon which is attached a front pair of hydraulic cylinders 428 (only one shown), a rear pair of hydraulic cylinders 424 (only one shown), and two cutting knife units 430a and 430b. A pair of compressible members 426 (only one shown) are attached to the rear pair of hydraulic cylinder 424.

The bottom floor assembly 420 is configured for radial movement around a first pivot point 432 located towards the front of the bottom floor assembly. The first pivot point 432 mechanically links the bottom floor assembly 420 with the sidewalls 414 by a member such as a rod, pin, or rotatable bolt. The first pivot point 432 is also the attachment point for the front pair of hydraulic cylinders 428. The first pivot point 432 is allowed vertical movement limited by a guide 429.

The rear pair of hydraulic cylinders are attached to the bottom floor assembly 420 by a third pivot point 436. In this embodiment, crop material enters the harvesting assembly from the left hand side of the illustration through an inlet 457. As crop material enters the crop collection channel, it exerts pressure on the bottom floor assembly 420.

If too much crop material enters at a given time, the pressure on the bottom floor assembly 420 may trigger a front pressure sensor (not shown) positioned on the front end of the bottom floor assembly, which extends both the front pair of hydraulic cylinders 428 and the rear pair of hydraulic cylinder 424 to increase the volume of the crop collection channel. The extension of the front pair of hydraulic cylinders 428 is limited by the guide 429. In some embodiments, the movement of the rear pair of hydraulic cylinders 424 is greater than the movement of the front pair of hydraulic cylinders 428. The additional crop material may also trigger a rear pressure sensor (not shown) positioned on the rear end of the bottom floor assembly, which extends only the rear pair of hydraulic cylinders 424, and/or the increased pressure may exceed the tension of the compressible members 426, such that the rearward end of the bottom floor assembly 420 pivots radially around the first pivot point 432 away from the rotor and blades 416. Either the extension of the pair of rear hydraulic cylinders 424, the stretching of the compressible member 426, or both increases the volume of the crop collection channel.

The movement of the bottom floor assembly 420 increases the volume of the crop collection channel, allowing the larger amount of crop material to pass through without plugging or clogging the harvester. When the larger amount of crop material has passed through the crop collection channel, the reduced pressure on the front or rear pressure sensors and/or the compressible members 426, returns the bottom floor assembly 420 to its original position. None, one, or both of the cutting knife units 430a and 430b can be in a loaded position, meaning that the individual knife blades (not shown) associated with each cutting knife unit are in an active crop cutting position within the crop collection channel. The rotation of the bottom floor assembly 420 is measured by a rotation sensor 440. The rotation sensor 440 is shown attached to the sidewall 414 by a bracket 441. The rotation sensor 440 is also attached to the bottom floor assembly 420 and hydraulic cylinder 424 by a first linking member 444 and a second linking member 446. The bracket 441 also attaches a potentiometer to the sidewall 414. The potentiometer is capable of rotation around a linear axis, and is operably connected to the first linking member 444. The first linking member 444 is operably connected to the second linking member 446 by a second pivot point 434. The second linking member 446 is connected to both the bottom floor assembly 420 and the rear hydraulic cylinder 424 at a third pivot point 436. At the starting position of the bottom floor assembly 420 (e.g. when there is no pressure on the bottom floor assembly 420 and no movement around the first pivot point 432), the signal reading from the rotation sensors 440 is zero. Movement of the bottom floor assembly 420 moves the second linking member 446, which, in turn, moves the first linking member 444 and the potentiometer around the linear axis 438. Larger movements in the bottom floor assembly 420 correspond to larger rotational movements in the potentiometer and a larger signal reading from the rotation sensor 440. Information from the rotation sensor 440 is sent to a controller in real-time during the operation of the harvester and harvesting assembly.

Figure 5:
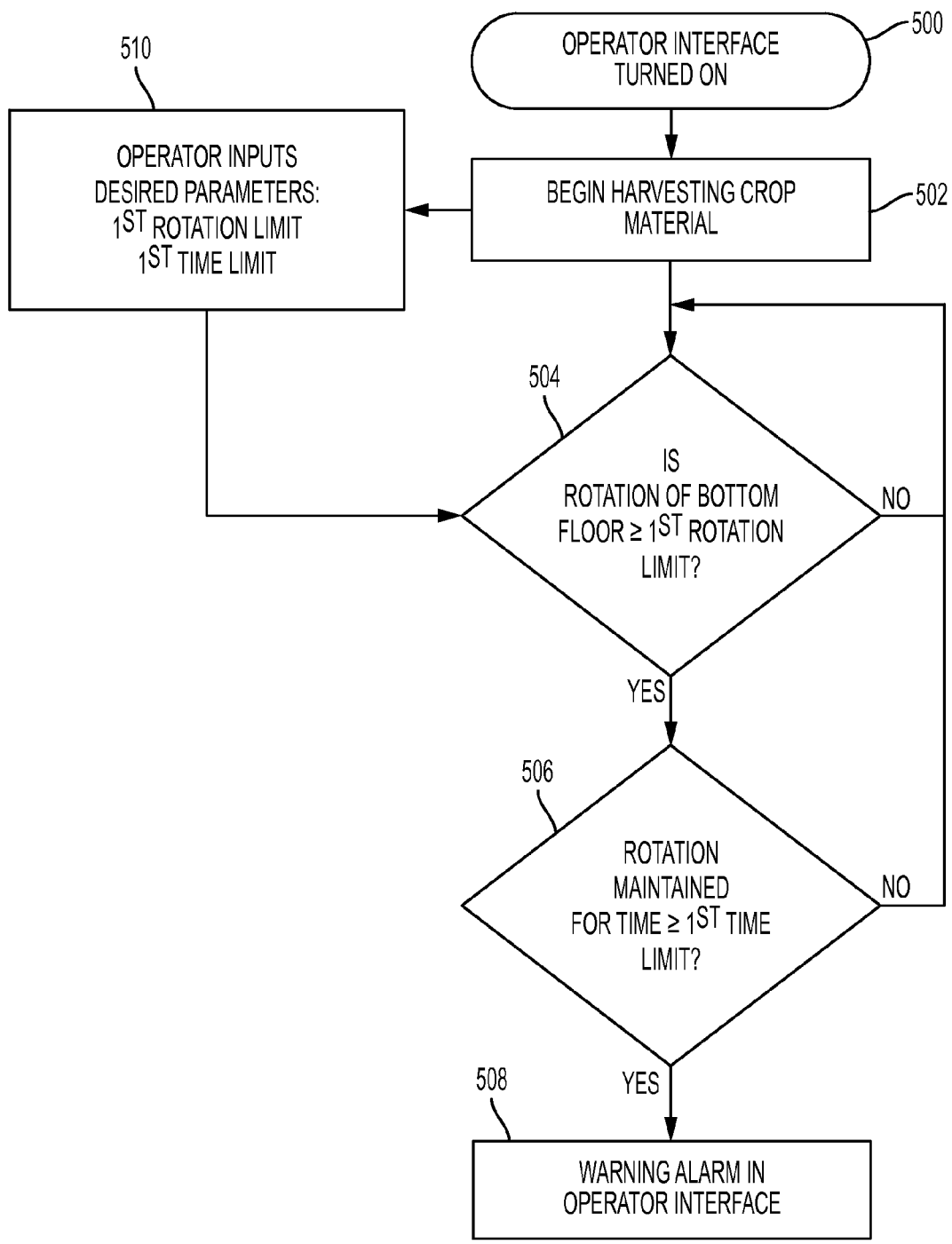
FIG. 5 depicts a flow diagram of a bottom floor control system.

FIG. 5 depicts a flow diagram of a bottom floor assembly control and information system. In step 500, the process begins when the operator interface is turned on, and the harvesting of crop material begins 502. Throughout the harvesting process, the rotational sensor 240 sends information on the current rotation of the bottom floor assembly to a controller. In step 504, the controller compares the current rotation of the bottom floor assembly with a first rotation limit value. If the current rotation is greater than or equal to the first rotation limit, the controller proceeds to step 506; if the current rotation is less than the first rotation limit, the controller continues to repeat step 504. In step 506, the controller checks to see if the current rotation has been maintained at or above the first rotation limit for a continuous period of time greater than or equal to a first time limit. If the rotation has been maintained for the continuous period of time, the controller proceeds to step 508; if the current rotation is less than the first rotation limit and the continuous period of time that the rotation was greater than or equal to the first rotation limit was less than the first time limit, the controller goes back to step 504. In step 506, the controller sends a signal to the operator interface to activate a warning alarm. The warning alarm can be a visual and/or audible cue to alert the operator that a crop jam or plug may be immanent. In some embodiments, the process also comprises step 510, which allows the operator to input several desired parameter, including the first rotation limit and the first time limit, before beginning the harvesting of crop material in step 502.

Figure 6:
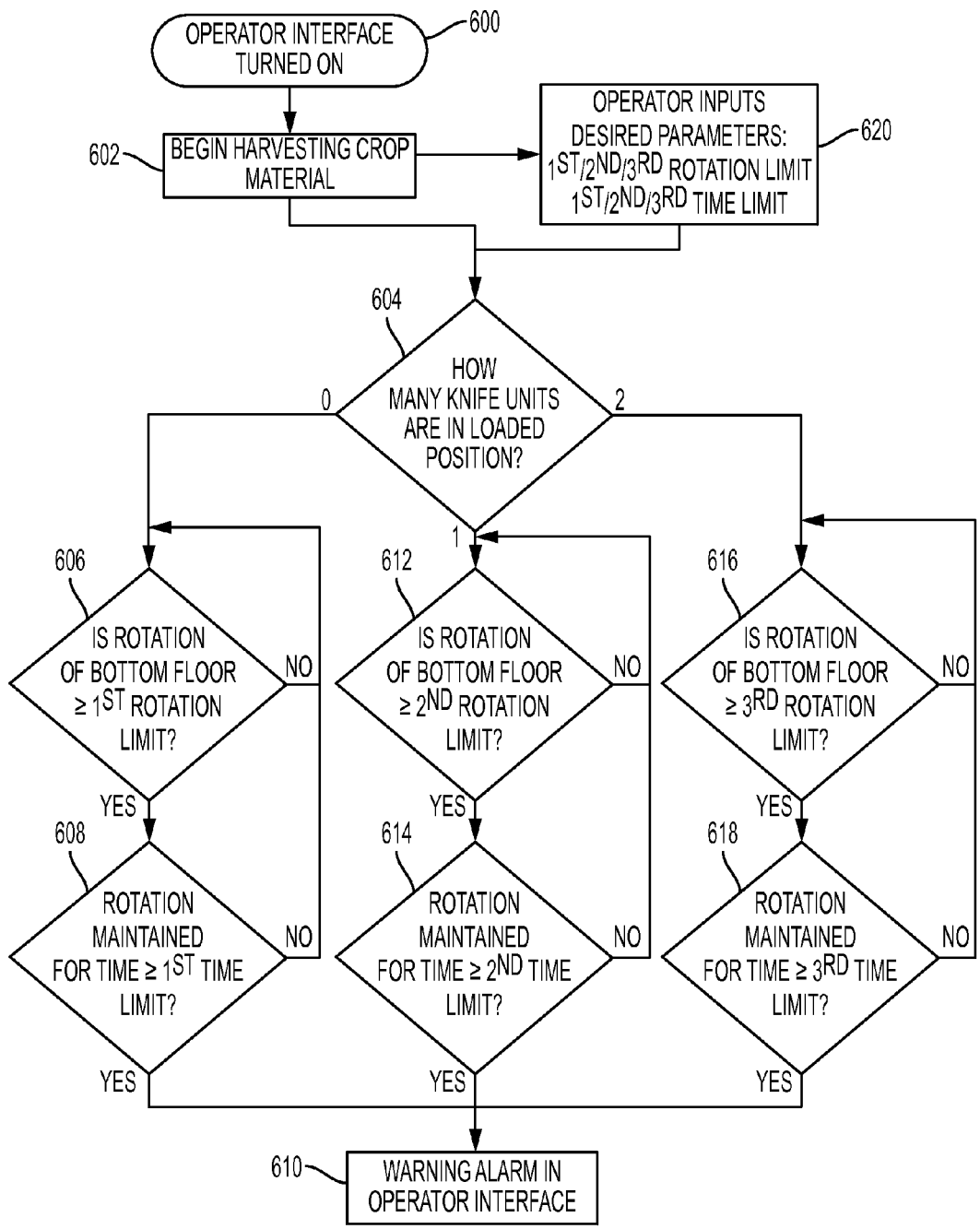
FIG. 6 depicts a flow diagram of a bottom floor control system that takes into account the position of one or more cutting knife units.

FIG. 6 depicts another flow diagram of a bottom floor assembly control and information system that also takes into account the position of one or more cutting knife units. In step 600, the process beings when the operator interface is turned on, and the harvesting of crop material begins 602. In step 604, a cutting knife unit sensor sends information on how many cutting knife units are current in their loaded positions (i.e. have their individual knife blades active in the crop collection channel). Depending on the result, the controller will select one of three processes to continue. Throughout the harvesting process, the rotational sensor 240 sends information on the current rotation of the bottom floor assembly to a controller.

If there are no cutting knife units in a loaded position, the controller will move on to step 606. In step 606, the controller compares the current rotation of the bottom floor assembly with a first rotation limit value. If the current rotation is greater than or equal to the first rotation limit, the controller proceeds to step 608; if the current rotation is less than the first rotation limit, the controller repeats step 606 until the current rotation is greater than or equal to the first rotation limit or the harvester is shut down. In step 608, the controller checks to see if the current rotation has been maintained at or above the first rotation limit for a continuous period of time greater than or equal to the first time limit. If the rotation has been maintained for that continuous period of time, the controller proceeds to step 610; if the current rotation is less than the first rotation limit and the continuous period of time that the rotation was greater than or equal to the first rotation limit was less than the first time limit, the controller goes back to step 606.

If there is one cutting knife unit in a loaded position, the controller will move on to step 612. In step 612, the controller compares the current rotation of the bottom floor assembly with a second rotation limit value. If the current rotation is greater than or equal to the second rotation limit, the controller proceeds to step 614; if the current rotation is less than the second rotation limit, the controller repeats step 612 until the current rotation is greater than or equal to the first rotation limit or the harvester is shut down. In step 614, the controller checks to see if the current rotation has been maintained at or above the second rotation limit for a continuous period of time greater than or equal to a second time limit. If the rotation has been maintained for that continuous period of time, the controller proceeds to step 610; if the current rotation is less than the second rotation limit and the continuous period of time that the rotation was greater than or equal to the second rotation limit was less than the second time limit, the controller goes back to step 612.

If there are two cutting knife units in a loaded position, the controller will move on to step 616. In step 616, the controller compares the current rotation of the bottom floor assembly with a third rotation limit value. If the current rotation is greater than or equal to the third rotation limit, the controller proceeds to step 618; if the current rotation is less than the third rotation limit, the controller repeats step 616 until the current rotation is greater than or equal to the first rotation limit or the harvester is shut down. In step 618, the controller checks to see if the current rotation has been maintained at or above the third rotation limit for a continuous period of time greater than or equal to a third time limit. If the rotation has been maintained for that continuous period of time, the controller proceeds to step 610; if the current rotation is less than the third rotation limit and the continuous period of time that the rotation was greater than or equal to the third rotation limit was less than the third time limit, the controller goes back to step 616.

In step 610, the controller sends a signal to the operator interface to activate a warning alarm. The warning alarm can be a visual and/or audible cue to alert the operator that a crop jam or plug may be immanent. In some embodiments, the process also comprises step 620, which allows the operator to input several desired parameters, including the first, second, and third rotation limits and the first, second, and third time limits, before beginning the harvesting of crop material in step 602.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A system comprising:
    a bottom floor assembly comprising:
    at least a first hydraulic cylinder;
    a bottom floor frame comprising at least one face comprising a concave curvature and extending laterally across the bottom floor assembly; and
    one or a plurality of bottom floor plates, covering the at least one face, and defining the concave curvature of a crop collection channel;
       at least a first rotation sensor, located on, within or proximate to the bottom floor assembly, said first rotation sensor configured to measure the rotation angle of the bottom floor frame;
       a controller, in operable communication and configured to process information from the at least first rotation sensor; and
       an operator interface, in electronic communication with the controller, configured to display information about the rotation angle of the bottom floor frame to an operator.

2. The system of claim 1, wherein the bottom floor frame Is capable of a variable range of motion around at least a first pivot point.

3. The system of claim 2, wherein the operator interface is further configured to receive and/or store a first rotational limit and a first time limit.

4. The system of claim 3, wherein, when the bottom floor frame is rotated to an angle greater than or equal to the first rotational limit, and said rotation is maintained for a duration of time greater than or equal to the first time limit, the operator interface displays warning information about the rotation angle of the bottom floor frame.

5. The system of claim 3, further comprising a first and a second cutting knife unit supported by the bottom floor frame;
    wherein both the first and the second cutting knife units comprise at least one or a plurality of blades;
    wherein, when the first and/or the second cutting knife units are in a loaded position, the at least one or a plurality of blades of the first and/or the second cutting knife units pass through at least one or a plurality of slots in the bottom floor plate and partially protrude into the crop collection channel; and
    wherein the at least one or a plurality of blades of the first cutting knife unit do not interfere with the at least one or a plurality of blades of the second cutting knife unit.

6. The system of claim 5, further comprising at least a first knife unit placement sensor, located on, within or proximate to the bottom floor assembly and in operable communication with the controller, capable of detecting if the first and/or second cutting knife units are in their loaded positions.

7. The system of claim 6, wherein the operator interface displays knife information about position of the first and/or second cutting knife units.

8. The system of claim 6, wherein the at least first operator interface is further configured to receive and/or store a second and a third rotational limit and a second and a third time limit.

9. The system of claim 8, wherein, when the first knife unit or the second knife unit is in a loaded position, the bottom floor frame is rotated to an angle greater than or equal to the second rotational limit, and said rotation is maintained for a duration of time greater than or equal to the second time limit, the operator interface displays warning information about the rotation angle of the bottom floor frame.

10. The system of claim 8, wherein, when the first knife unit and the second knife unit are in loaded positions, the bottom floor frame is rotated to an angle greater than or equal to the third rotational limit, and said rotation is maintained for a duration of time greater than or equal to the third time limit, the operator interface displays warning information about the rotation angle of the bottom floor frame.

11. The system of claim 1, wherein the information is warning information displayed by the operator interface and said warning information comprises visual and/or audible communication.

12. The system of claim 1, wherein the first rotation sensor comprises:
    at least a first bracket mechanically linked to a sidewall;
    an angle position sensor fastened to the at least first bracket; and
    a potentiometer, operably connected to a the angle position sensor and rotatable around a first linear axis transverse to the sidewall; and wherein the angle position sensor is capable of detecting the rotation of the potentiometer.

13. The system of claim 12, wherein the first rotation sensor further comprises:
a first linking member operably connected to the potentiometer; and
a second linking member operably connected to the first linking member at a second pivot point, and operably connected to the bottom floor frame at a third pivot point; and
wherein movement of the bottom floor frame around the first pivot point causes movement of the first linking member and the potentiometer around the first linear axis.

14. A computer-implemented method of operating a harvester, in a system comprising a bottom floor assembly, at least a first rotation sensor, a controller, and an operator interface, said method comprising:
(a) in the controller, receiving information on the rotational position of the bottom floor assembly from the at least first rotation sensor;
(b) in the controller, sending an alert signal to the operator interface if the rotational position of the bottom floor assembly is greater than or equal to a first rotational limit for a continuous duration determined by a first time limit; and
(c) in the operator interface, displaying visual and/or audible warning information if the alert signal is received from the controller.

15. The computer-implemented method of claim 14, wherein an operator inputs the first rotational limit and the first time limit at the operator interface prior to receiving information on the rotational position of the bottom floor assembly from the at least first rotation sensor.

16. The computer-implemented method of claim 14, wherein the system further comprises a first cutting knife unit, a second cutting knife unit, and at least a first knife unit placement sensor, capable of detecting if the first and/or second cutting knife units are in a loaded position; and wherein the method comprises:
(a) in the controller, receiving information on the rotational position of the bottom floor assembly from the at least first rotation sensors;
(b) in the controller, receiving information on the number of knife units in a loaded position from the at least first knife unit placement sensor;
(c) in the controller, sending an alert signal to the operator interface if:
(i) there are no knife units in a loaded position, the rotational position of the bottom floor assembly is greater than or equal to a first rotational limit for a continuous duration determined by a first time limit; or
(ii) there is one knife unit in a loaded position, the rotational position of the bottom floor assembly is greater than or equal to a second rotational limit for a continuous duration determined by a second time limit; or
(iii) there are two knife units in a loaded position, the rotational position of the bottom floor assembly is greater than or equal to a third rotational limit for a continuous duration determined by a third time limit;
(d) in the operator interface, displaying visual and/or audible warning information if the alert signal is received from the controller.

17. The computer-implemented method of claim 16, wherein the operator inputs any one or combination of the second rotational limit, the third rotational limit, the second time limit, and/or the third time at the operator interface prior to receiving information on the rotational position of the bottom floor assembly from the at least first rotation sensors.

18. A computer program product encoded on a non-transitory computer-readable storage medium comprising instructions for:
(a) receiving information on a rotational position of a bottom floor assembly from at least a first rotation sensor;
(b) sending an alert signal to an operator interface if the rotational position of the bottom floor assembly is greater than or equal to a first rotational limit for a continuous duration determined by a first time limit; and
(c) displaying visual and/or audible warning information if the alert signal is received from a controller.

19. The computer program product of claim 18, wherein an operator inputs the first rotational limit and the first time limit at the operator interface prior to receiving information on the rotational position of the bottom floor assembly from the at least first rotation sensor.

20. The computer program product of claim 19, wherein the instructions further comprise:
(a) receiving information on the rotational position of the bottom floor assembly from the at least first rotation sensors;
(b) receiving information on the number of knife units in a loaded position from the at least first knife unit placement sensor;
(c) sending an alert signal to the operator interface if:
(i) there are no knife units in a loaded position, the rotational position of the bottom floor assembly is greater than or equal to a first rotational limit for a continuous duration determined by a first time limit; or
(ii) there is one knife unit in a loaded position, the rotational position of the bottom floor assembly is greater than or equal to a second rotational limit for a continuous duration determined by a second time limit; or
(iii) there are two knife units in a loaded position, the rotational position of the bottom floor assembly is greater than or equal to a third rotational limit for a continuous duration determined by a third time limit;
(d) displaying visual and/or audible warning information in the operator interface if the alert signal is received from the controller.

21. A system comprising the computer program product of claim 18, at least one I/O bus and a display.

22. The system of claim 21, further comprising the computer program product of claim 20, at least a second I/O bus, and at least a first rotation sensor.

* * * * *